June 24, 1930.  C. SCULL, SR  1,766,956
METHOD OF MAKING BRAKE DRUMS
Original Filed Sept. 20, 1926
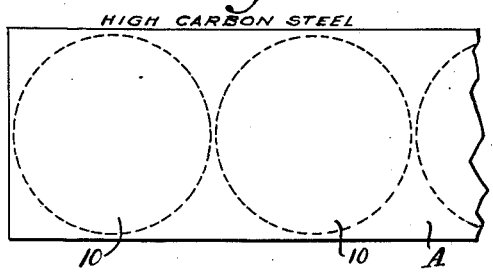
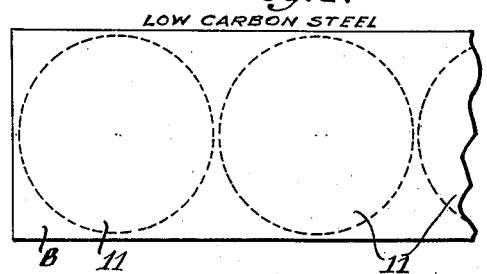
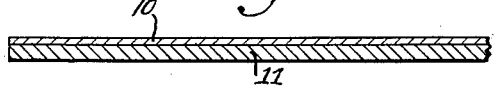
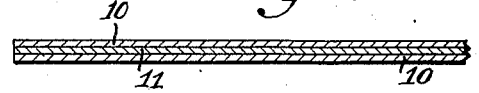
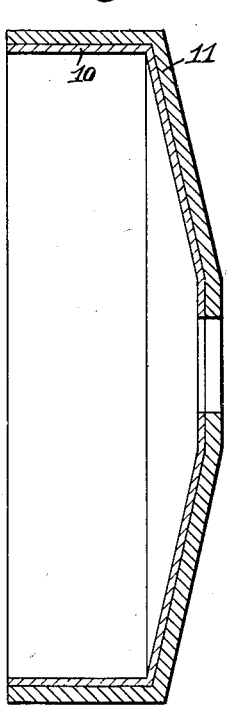
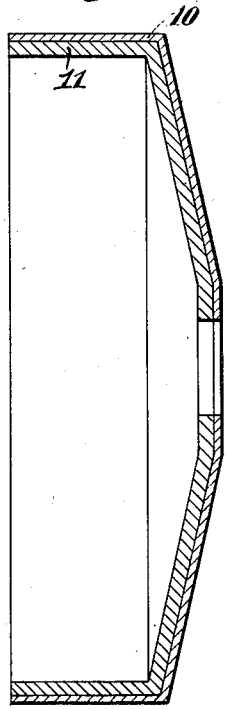
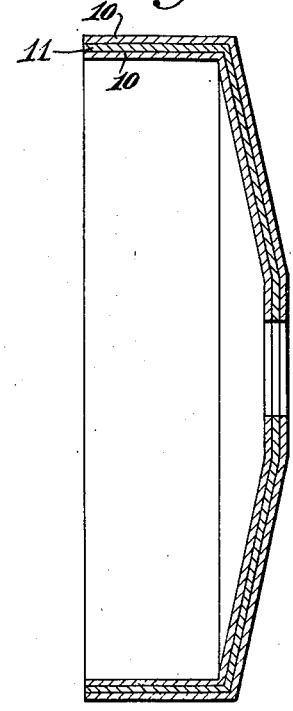
INVENTOR.
CHESTER SCULL SR.
BY
ATTORNEY.

Patented June 24, 1930

1,766,956

UNITED STATES PATENT OFFICE

CHESTER SCULL, SR., OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

METHOD OF MAKING BRAKE DRUMS

Original application filed September 20, 1926, Serial No. 136,494. Divided and this application filed August 4, 1927. Serial No. 210,532.

My present invention relates to improvements in the method of making brake drums.

This application is a division of my pending application for Letters Patent, Serial No. 136,494 filed September 20, 1926.

In the use of brakes for machines, either stationary or motive, a chief consideration has always been the wearing quality of the bearing surface of the brake drum. Low carbon steel has long been the metal which has been used for brake drums by those skilled in the art because this grade of steel possesses those qualities which were, until this invention, best adapted for the economical manufacture of brake drums. Its wearing quality was fair and it could be readily finished by the stamping or drawing from the sheet metal. It was this last reason which was most controlling because a metal which could be cold stamped or cold drawn from the flat sheet was the one which was the most readily adapted for the economical manufacture of brake drums.

However, the practice of using low carbon steel had many serious disadvantages. Its wearing quality was not as good as was deemed desirable for brake drums where the heat generated by frictional resistance was always considerable. Further, while such a steel was found to be adapted for stamping or drawing operations, this was offset to a considerable extent by the fact that the brake drum was more or less easily bent out of concentric trueness while in service. In fact, it was quite a difficult proposition, requiring several operations in addition to the drawing operation, to manufacture a brake drum of soft steel having a perfectly true braking surface. Grinding and other hand operations were resorted to as necessary in the attainment of a true bearing surface, and in some cases it was found necessary to place the brake drums upon lathes to obtain this concentric surface.

Having in mind to obviate the disadvantages existing in the manufacture of brake drums, one of the objects of my invention is the provision of a brake drum having a bearing surface of high carbon steel whereby the wearing quality of the bearing surface is considerably increased.

Another object is the provision of a brake drum which will be efficient, light in weight and which can be readily and economically manufactured.

Still another object is to provide a method of manufacturing high carbon steel brake drums by cold stamping or drawing operations.

Still another object is the provision of a laminated brake drum having an increased resistance to heat generated by friction between the contact drum and the brake shoe and still further to a brake drum, the supporting body of which is made of low carbon steel while the bearing surface or surfaces thereof are made of high carbon steel.

A further object is to provide a novel and improved process of manufacturing brake drums which consists of two or more sections.

Further objects and advantages relating to details and economies of manufacture and operation will definitely appear from the following description of the invention as shown in the accompanying drawings and finally pointed out in the appended claims.

Referring to the accompanying drawings:

Fig. 1 is a plan view of a sheet of high carbon steel indicating the blanks thereon in dotted lines.

Fig. 2 is a similar view of a sheet of low carbon steel.

Fig. 3 is a sectional view through a pair of superposed blanks ready for the stoving or coining operation.

Fig. 4 is a similar view of a modified form of assembly, and

Figs. 5, 6 and 7 are fragmentary sectional views through brake drums constructed in accordance with my invention and illustrating respectively a drum for an internal brake, a drum for an external brake, and a drum for both internal and external brakes.

In general, my invention contemplates the manufacture of a brake drum having a plurality of layers of sheet steel of different carbon content. As has already been stated, it has been the prior practice to form brake drums of a relatively low carbon steel because this type of steel is best adapted to the preferred method of making brake drums, which is that of cold drawing or stamping from the sheet metal. But soft steel brake drums wear out too rapidly. Also they heat up too quickly with the consequence that they rapidly burn up the linings on the brake bands. These soft brake drums are easily forced out of true with the result that when the braking pressure is applied, friction is not evenly distributed around the hub of the machine which causes unequal wearing of the band. It has been proposed to use a higher carbon steel in place of the soft steel heretofore employed, but the difficulty was encountered that high carbon steel of the thickness demanded for the safe and proper design of brake drums could not be cold drawn or stamped.

In the manufacture of brake drums according to one form of my invention I use two grades of steel, one of relatively low carbon and the other of relatively high carbon content. The high carbon or hard steel is preferably of a thickness approximately one third that of the low carbon or soft steel and the two combined have a thickness equal to that of the ordinary low carbon steel brake drum. I have found that when the sheets of hard and soft steel are placed one on the other and then simultaneously operated upon by the pressing machine the two are easily formed into a unitary, laminated brake drum. Ordinarily high carbon content steel could not be cold pressed in a die pressing machine without having the steel crack and collapse. However, by using a high carbon steel of this relatively thin gauge and providing it with a backing of low carbon steel, I have found that the two layers can be cold drawn or stamped without difficulty and that the result is a brake drum having a bearing surface of marked increased wearing quality.

It is, of course, to be understood that where it is intended to make a brake drum for use with an internal brake, that is, with an expanding type of brake, the layers of high and low carbon steels are so arranged relatively that the result after they have been simultaneously operated upon by the pressing machine will be that the high carbon steel layer and the low carbon steel layer will be on the inside and outside, respectively, of the finished disc and vice versa if the drum is to accommodate the external type of brake, that is, the contracting type, the layers are arranged in the pressing machine so that the finished drum will have the high carbon steel layer on the outside. It is further to be understood that it is within the contemplation of my invention to make a brake drum of the combined external and internal type. In such a case a layer of high carbon steel is placed on each side of a layer of low carbon steel and the three layers are die formed simultaneously to form a brake drum to accommodate both the internal and external type of brake. In this last case the result will be a three ply brake drum, and as described above it also will preferably have a combined thickness not greater than that of the usual soft steel brake drum.

In the carrying out of my invention the blanks of high and low carbon steel are cut from the sheet to the requisite diameter. They are then superposed one on the other in a manner depending altogether on the particular type of drum which is to be made, after which they are simultaneously formed in the pressing machine. I have found that when so formed, the two layers of steel (or three layers in the case of combined internal and external type of drum) are intimately nested together and hence are in effect substantially an integral unit. However, it may be found preferable to spot weld the laminations together which may be done either before or after the forming operation has taken place as will be described in somewhat greater detail hereinafter.

Referring now to the drawings, A and B represent sheets of high and low carbon content steel respectively from which the blanks 10 and 11 are cut from a certain predetermined diameter as indicated by the dotted circles of Figs. 1 and 2. While both hard and soft steel blanks are of the same diameter for a certain size of wheel, the former is of considerably thinner gauge than the latter. However, in no case is the combined thickness of both hard and soft steels greater than the usual thickness of the ordinary brake drum. For example, in the two ply drum the high carbon content steel is of a gauge which is about one third that of the total thickness of the brake drum.

Having cut out the blanks 10 and 11 from the sheets A and B, the next operation in order is the stoving or coining operation by which the superposed layers of hard and soft steel are simultaneously operated upon by the dies of a forming machine (not shown). This coining operation gives the blank the form shown in cross section in either Figs. 5 or 6, and it will be observed that by this operation the blanks 10 and 11 are nested together so intimately that they form substantially an integral brake drum. As has already been explained, where the brake drum is to accommodate the external type of brake the layer of hard steel is so disposed relatively with respect to the layer of soft steel that the drum, when it emerges from the coining operation will be formed with the layer of hard metal on the outside, as shown in Fig. 6. On the other hand, if the drum is to be of the combined internal and external type, the intermediate layer is of soft steel with the outer and inner layers of hard steel as shown in Fig. 7. In each case, however, whether the drum be of the internal, external or combined external and internal type, the overall thickness is substantially the same for an equal size of brake drum.

It is within the contemplation of my invention to spot weld the several laminations together if desired. This welding together of the several laminations may take place either before or after the initial coining operation, or in other words, the flat blanks 10 and 11 may be welded together at suitable points before any actual forming operations are carried out, or after the drum is formed. I have found, however, that where the plates in their unwelded form have passed through the stoving or coining step, they are so intimately nested together that they form a practically integral unitary drum making unnecessary the employment of welds, rivets or other fastening means.

It will be seen from the foregoing that I have provided a method which makes possible the manufacture of inexpensive "high carbon" brake drums to supply a need long felt in the automotive art. Because of the laminated construction, one lamination of hard and another of soft steel, it becomes possible to cold draw or stamp the high carbon steel for the reason that soft or low carbon steel provides the backing or supporting element for the harder metal during the formation operation. Not only is this brake drum thus provided with a long wearing braking surface having a high resistance against frictional heat and the destructive effects caused by such heat, but a drum having a concentrically truer braking surface is provided with a minimum number of forming operations. The hard steel facing when acted upon by the forming machine is not subject to distortion nearly as much as soft steel heretofore employed. This means that all those operations subsequent to the initial forming operation for removing the irregularities in the braking surface are eliminated, a true surface being obtained at the very outset. Further, the disadvantage of having a brake drum liable to become distorted during service with the consequence that an irregular braking surface is provided for the brake bands is practically and entirely eliminated.

It is conceivable, of course, that various other forms and modifications of my invention may be devised by those skilled in the art and it is my intention, therefore, to claim my invention broadly in the manner indicated by the appended claims.

What I claim is:—

1. The method of making brake drums which consists in providing a blank of high carbon steel and a blank of low carbon steel, arranging said blanks in superposed position, and then deforming both of said blanks simultaneously to form a unit brake drum.

2. The method of making brake drums which consists in providing two blanks of high carbon steel and a single blank of low carbon steel, arranging said blanks in superposed position with the low carbon steel blank intermediate said high carbon steel blanks, then deforming all of said blanks simultaneously to form a unit brake drum.

3. The method of making brake drums which consists in providing a metal blank of relatively high wear resisting qualities and relatively difficult to die draw by itself, and a metal blank relatively easy to die draw, super-imposing said blanks with said first-named blank presenting an exposed surface, then deforming said blanks to form a unit brake drum, with said exposed surface in position to be engaged by a brake shoe.

4. The method of making brake drums which consists in providing a metal blank of relatively high wear resisting qualities and relatively difficult to die draw by itself, and a metal blank relatively easy to die draw, super-imposing said blanks with said first-named blank presenting an exposed surface, then deforming said blanks and welding them together to form a unit brake drum, with said exposed surface in position to be engaged by a brake shoe.

5. The method of making brake drums which comprises simultaneously forming a plurality of sheet metal blanks, superimposing the blanks, and forming the outer portions of such superimposed blanks into a brake engaging flange.

6. The method of making brake drums which comprises taking a plurality of sheet metal blanks, super-imposing said blanks and forming the outer portions of said superimposed blanks into a brake-engaging flange.

In testimony whereof he hereunto affixes his signature.

CHESTER SCULL, Sr.